(12) United States Patent
Kairali et al.

(10) Patent No.: US 12,511,290 B1
(45) Date of Patent: Dec. 30, 2025

(54) QUERY OPTIMIZATION AND DISTRIBUTION

(71) Applicant: INTERNATIONAL BUSINESS MACHINES CORPORATION, Armonk, NY (US)

(72) Inventors: Sudheesh S. Kairali, Kozhikode (IN); Arin Sara Mathew, Kochi (IN); Kanchana Padmanabhan, San Jose, CA (US); Shweta Shandilya, Bangalore (IN); Sriram Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/979,120

(22) Filed: Dec. 12, 2024

(51) Int. Cl.
   *G06F 16/2453* (2019.01)

(52) U.S. Cl.
   CPC .. *G06F 16/24542* (2019.01); *G06F 16/24549* (2019.01)

(58) Field of Classification Search
   CPC ................. G06F 16/24542; G06F 16/24549
   See application file for complete search history.

(56) References Cited

U.S. PATENT DOCUMENTS

| | | | | |
|---|---|---|---|---|
| 6,353,818 B1 * | 3/2002 | Carino, Jr. | ........ | G06F 16/24542 |
| 6,438,741 B1 * | 8/2002 | Al-omari | .......... | G06F 16/24542 |
| | | | | 707/694 |
| 7,734,615 B2 * | 6/2010 | Anderson | ............... | G06F 16/22 |
| | | | | 707/713 |
| 7,739,267 B2 | 6/2010 | Jin et al. | | |
| 8,140,522 B2 * | 3/2012 | Min | ................... | G06F 16/2462 |
| | | | | 707/718 |

(Continued)

FOREIGN PATENT DOCUMENTS

CN 113297198 B 4/2022

OTHER PUBLICATIONS

Liu et al., Distributed Query Scheduling Service: An Architecture and Its Implementation, 1998, pp. 1-40 (Year: 1998).*

(Continued)

*Primary Examiner* — Jorge A Casanova
(74) *Attorney, Agent, or Firm* — Teddi Maranzano, Esq.; Rachel L. Pearlman, Esq.; Heslin Rothenberg Farley & Mesiti P.C.

(57) ABSTRACT

Computer implemented methods, systems, and computer program products include program code executing on a processor(s) monitors query execution within the database system within the multiple databases and by the multiple query optimization engines. The program code retains statistical information from the monitoring in a centralized database. The program code obtains, at a query optimization engine of the database system, a new query. The program code predicts, based on accessing the statistical information in the centralized database, that executing the new query with the query optimization engine at a designated execution time comprises a suboptimal execution of the new query. The program code alters a planned execution of the new query at the designated execution time with the query optimization engine to optimize execution of the query within the database system.

20 Claims, 5 Drawing Sheets

(56) References Cited

U.S. PATENT DOCUMENTS

| | | | | |
|---|---|---|---|---|
| 8,224,807 | B2* | 7/2012 | Lim | G06F 16/217 |
| | | | | 707/713 |
| 8,688,819 | B2* | 4/2014 | Barsness | G06F 16/2453 |
| | | | | 709/205 |
| 10,747,765 | B2* | 8/2020 | Arnold | G06F 16/24545 |
| 11,275,734 | B2 | 3/2022 | Potharaju et al. | |
| 11,914,590 | B1* | 2/2024 | Plenderleith | G06F 16/24552 |
| 12,332,894 | B2* | 6/2025 | Kavalakuntla | G06F 16/24539 |
| 2006/0095440 | A1* | 5/2006 | Dettinger | G06F 16/252 |
| 2018/0011901 | A1* | 1/2018 | Kumar | G06F 16/951 |
| 2018/0060389 | A1* | 3/2018 | Hwang | G06F 16/24542 |
| 2023/0074090 | A1* | 3/2023 | Chong | G06F 16/24561 |
| 2023/0394043 | A1 | 12/2023 | Kalmanek, Jr. et al. | |

OTHER PUBLICATIONS

"Distributed Query Processing and Optimization", Database Internals, 2014, 25 pages.

"Query Optimization in Distributed Systems", retrieved from web https://www.tutorialspoint.com/distributed_dbms/distributed_dbms_query_optimization_distributed_systems.html, dated Sep. 12, 2024, 5 pages.

Weintraub et al., "Optimizing Cloud Data Lake Queries with a Balanced Coverage Plan", IEEE Transactions on Cloud Computing, 2023, 17 pages.

* cited by examiner

QUERY OPTIMIZATION AND DISTRIBUTION

BACKGROUND

One or more aspects relate, in general, to facilitating processing within a computing environment, and in particular, to optimizing query execution through efficient resource utilization.

A database management system (DBMS) handles various query types, each with its own characteristics, which impact the system's performance. Resource allocation, such as central processing units (CPUs), memories, and disks, differs based on whether a query is CPU intensive, memory intensive, or input/output (I/O) intensive. Traditionally, load balancing for database servers relies on basic metrics like server idleness to determine where to direct a query or transaction. The challenges of load-balancing in database systems can be exacerbated in more complex computing environments. In a cloud environment or large-scale distributed computing cluster, these challenges arise.

A data lakehouse is a data platform, which merges the aspects of data warehouses and data lakes into one DBMS. A data lakehouse leverages cloud object storage to store a broader range of data types, including but not limited to structured data, unstructured data and semi-structured data. The flexibility of this data architecture enables data teams to accelerate data processing as this processing no longer straddles two disparate data systems (e.g., data warehouses and data lakes) to complete and scale more advanced analytics, such as machine learning (ML).

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. ML has been described as the field of study that gives computers the ability to learn without being explicitly programmed.

A query optimizer is a DBMS component that analyzes Structured Query Language (SQL) queries and determines efficient execution mechanisms. A query optimizer generates one or more query plans for each query, each of which can be a mechanism used to run a query and selects the most efficient query plan to run the query. Hence, a query optimizer decides the best method for implementing each query in a databases system, including in a data lakehouse. Program code comprising a query engine of a DBMS can parse, analyze, optimize, and execute queries.

SUMMARY

Shortcomings of the prior art are overcome, and additional advantages are provided through the provision of a computer-implemented method for distributing query optimization activities across a database system comprising multiple databases and multiple query optimization engines. The method can include: monitoring, by one or more processors, query execution within the database system within the multiple databases and by the multiple query optimization engines; retaining, by the one or more processors, statistical information from the monitoring in a centralized database; obtaining, by the one or more processors, at a query optimization engine of the database system, a new query; predicting, by the one or more processors, based on accessing the statistical information in the centralized database, that executing the new query with the query optimization engine at a designated execution time comprises a suboptimal execution of the new query; and altering, by the one or more processors, a planned execution of the new query at the designated execution time with the query optimization engine to optimize execution of the query within the database system.

Shortcomings of the prior art are overcome, and additional advantages are provided through the provision of a computer program product for distributing query optimization activities across a database system comprising multiple databases and multiple query optimization engines. The computer program product comprises a storage medium readable by one or more processors and storing instructions for execution by the one or more processors for performing a method. The method includes, for instance: monitoring, by the one or more processors, query execution within the database system within the multiple databases and by the multiple query optimization engines; retaining, by the one or more processors, statistical information from the monitoring in a centralized database; obtaining, by the one or more processors, at a query optimization engine of the database system, a new query; predicting, by the one or more processors, based on accessing the statistical information in the centralized database, that executing the new query with the query optimization engine at a designated execution time comprises a suboptimal execution of the new query; and altering, by the one or more processors, a planned execution of the new query at the designated execution time with the query optimization engine to optimize execution of the query within the database system.

Shortcomings of the prior art are overcome, and additional advantages are provided through the provision of a system for distributing query optimization activities across a database system comprising multiple databases and multiple query optimization engines. The system includes: a memory, one or more processors in communication with the memory, and program instructions executable by the one or more processors via the memory to perform a method. The method can include: monitoring, by the one or more processors, query execution within the database system within the multiple databases and by the multiple query optimization engines; retaining, by the one or more processors, statistical information from the monitoring in a centralized database; obtaining, by the one or more processors, at a query optimization engine of the database system, a new query; predicting, by the one or more processors, based on accessing the statistical information in the centralized database, that executing the new query with the query optimization engine at a designated execution time comprises a suboptimal execution of the new query; and altering, by the one or more processors, a planned execution of the new query at the designated execution time with the query optimization engine to optimize execution of the query within the database system.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
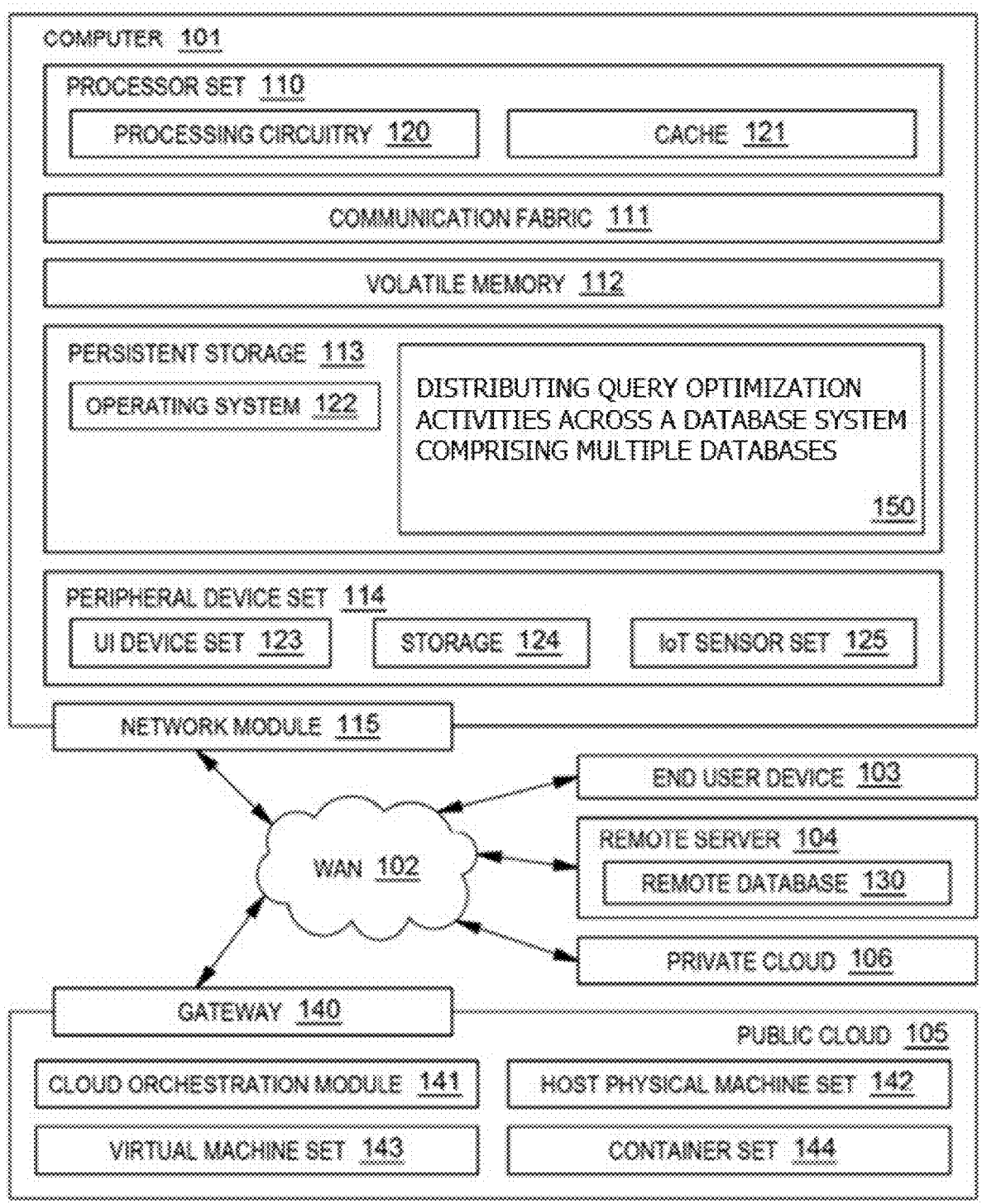
FIG. 1 depicts one example of a computing environment to perform, include and/or use one or more aspects of the present disclosure.

The computer-implemented methods, computer program products, and systems described herein comprise program code executing on one or more processors that enhance data lakehouse architecture to enable query optimization and query execution efficiency within this system. Data lakehouses can provide multiple engines of same and different types to users and these various engines can provide various levels of optimization. Query optimization within a DBMS, including within a lakehouse, can be a resource intensive activity on the engine engaged in the optimization. However, within current lakehouse architectures and utilizing current optimization approaches, the different engines cannot automatically assist each other in query optimization even if a first engine, which is engaged in optimizing a query, is low on resources and a second engine has resources to spare. The examples herein implement technical architecture components to enable collaboration between DBMS resources in a data lakehouse so that queries can be optimized and run efficiently across resources, including by not limited to, database engines. The examples herein enhance database lakehouse architecture such that similar and dissimilar query engines managed by the DBMS can expose optimization endpoints. A query engine endpoint refers to a specific network location (e.g., an address) where a user or client (e.g., an application) can send data queries to a query engine, which then processes the query and returns the requested data back to the user. It is a designated point of access to interact with a system that can retrieve information from a database using queries. The program code of the DBMS in the examples herein can enable consumption of these end points in query execution based on established relationships (e.g., contracts). When the program code in the examples (e.g., controlled by the DBMS) herein consumes the endpoints to execute queries, the program code can safeguard the execution by utilizing fallbacks and by enabling changes in query life cycle, including but not limited to, adding novel stages for efficient implementation. Although a lakehouse is used as an example of a multiple database environment into which the aspects herein can be integrated, various aspects described herein can also be integrated into other multiple database environments in order to optimize queries and hence, overall system performance.

The computer-implemented methods, computer program products, and systems described herein comprise program code provide various enhancements to the lakehouse architecture which enable efficient query planning and execution. In some examples, the program code operates as an optimization service between engines of a multiple engine lakehouse and includes fallback logic. In some examples, the program code identifies and acquires a best optimizer service with the lakehouse for use in query optimization. In these examples, the program code identifies similar engines with capacity (executing fewer activities) and transmits a query to a target engine for optimization based on determining this similarity and capacity. In some examples, the program code can perform a pre-emptive query optimization based on predicting resource capacities. For example, the program code can determine that a query will utilize a given lakehouse engine based on parameters including, time of the day, day of the week, etc. The program code can access various statistics to make this determination. In this example, if the query is suboptimized based on the time taken to execute, the program code can utilize a control plane to calculate the time utilized to optimize the query. If the program code determines that the time to optimize the query is significant (e.g., above a pre-defined threshold), the program code can transmit the query to a lakehouse engine such that this engine can pre-emptively optimize the query and cache the optimized query for execution. In some examples, the program code can determine that an optimized query is running longer than expected (or accounted for in the execution plan) and based on identifying this lag, the program code can pause the execution and wait until for the optimizer to be available rather than optimizing what the program code has determined is a sub-optimally optimized query. In some examples herein, program code executing on one or more processors performs cost optimization that is based on time window-based optimization.

The examples herein are inextricably tied to computing and are directed to a practical application. The examples herein provide a computer-based solution to an issue in computing. Many applications and products rely on executing queries in databases. How these queries pull data from various databases within computing systems, such as distributed systems, can be managed by middleware, including database management software. As computing systems grow and enterprise, hybrid, and cloud or other distributed computing environments become more prevalent, inefficient queries can stress the system as a whole and can compromise the performance of the system. The examples herein are inextricably tied to computing at least because they improve the availability of resources through management of query optimization engines. As will be discussed herein, the computer program products, computer-implemented methods, and computing systems disclosed herein are directed to a practical application in that they provide high-performance resource and job scheduling (e.g., query execution) based on query optimization engines resources allocation and inter-communication. The DBMS in the examples herein can distribute query optimization and execution over various engines in a complex multiple database system, including but not limited to, a data lakehouse.

The examples herein provide significantly more than existing approaches to efficient distributed query optimization in a data lakehouse. Unlike existing approaches to efficient distributed query optimization based on enabling assignment and utilization of a best optimizer service for each query performed on lakehouse resources. Additionally, unlike existing approaches, the examples herein provide pre-emptive query optimization based on predicting query behavior within the data lakehouse. The examples herein also offer significantly more than existing approaches by enabling delaying and re-trying queries to allow for the utilization of optimization resources in accordance with availability. Finally, the program code, unlike existing approaches, optimizes costs based on the time window in which queries are executed. Certain of these advantages are particularly relevant in data lakehouse environments as they introduce functionality that was not enabled in existing approaches.

The examples herein include a computer-implemented method, a computer program product, and a computer system, for distributing query optimization activities across a database system comprising multiple databases and multiple query optimization engines. In certain of these examples, program code monitors query execution within the database system within the multiple databases and by the multiple query optimization engines. The program code retains statistical information from the monitoring in a centralized database. The program code obtains, at a query optimization engine of the database system, a new query. The program code predicts, based on accessing the statistical information in the centralized database, that executing the new query with the query optimization engine at a designated execution time comprises a suboptimal execution of the new query. The program code alters a planned execution of the new query at the designated execution time with the query optimization engine to optimize execution of the query within the database system.

In some examples of the computer-implemented method, the computer program product, and/or the computer system, altering the planned execution of the new query at the designated execution time with the query optimization engine comprises: the program code determining that an existing workload of the query optimization engine will cause the suboptimal execution. The program code also identifies a similar optimization engine with capacity to execute the new query. The program code transmits the new query to a similar optimization engine. The program code executes the new query with the similar optimization engine.

In some examples of the computer-implemented method, the computer program product, and/or the computer system, altering the planned execution of the new query at the designated execution time with the query optimization engine comprises: the program code determining that an existing workload of the query optimization engine will cause the suboptimal execution, wherein the determining comprises: the program code determining, based on the statistical information that historical queries similar to the new query executed suboptimally when executed by query optimization engines of a given types, and where the query optimization engine is of the given type. The program code identifies an optimization engine of a type different than the given type, wherein the optimization engine of the type different comprises capacity and functionality to execute the new query. The program code transmits the new query to the optimization engine of the different type. The program code executes the new query with the optimization engine of the different type.

In some examples of the computer-implemented method, the computer program product, and/or the computer system, altering the planned execution of the new query at the designated execution time with the query optimization engine comprises: the program code determining that optimizing the query in advance of the designated execution time will improve performance by an amount of time about a pre-defined threshold. The program code pre-emptively optimizes, with the query optimization engine, the new query in advance of the designated execution time. The program code caches the new query in a memory. The program code executes the new query at the designated execution time, based on obtaining the pre-emptively optimized query from the memory.

In some examples, the program code altering the planned execution of the new query at the designated execution time with the query optimization engine comprises: the program code commencing execution of the new query by the query optimization engine. In advance of completing of the execution, the program code determines that the executing is longer than an anticipated threshold amount of time. The program code determines that other query optimization engines of the multiple query optimization engines are unavailable to execute the new query. The program code pauses the execution of the new query by the query optimization engine.

In some examples of the computer-implemented method, the computer program product, and/or the computer system, the program code determines that a given query optimization engine of the other query optimization engines is available to accept the new query. The program code transmits the new query to the given query optimization engine. The program code executes the new query with the given optimization engine.

In some examples of the computer-implemented method, the computer program product, and/or the computer system, the program code executing the new query with the given optimization engine comprises re-optimizing the query.

In some examples of the computer-implemented method, the computer program product, and/or the computer system, the program code, the statistical information comprises query log events and details relevant to various stages of query execution.

In some examples of the computer-implemented method, the computer program product, and/or the computer system, the program code, the database system comprises a data lakehouse.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code for efficiently distributing query optimization activities across a database system comprising multiple databases (e.g., a data lakehouse) 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

When executing a user-initiated query on a resource of a data lakehouse (e.g., via an application), the DBMS of the data lakehouse could potentially provide multiple engines, some of which are the same and some of which differ, for optimization and/or execution of the query based on the user type of the user. In this technical environment, various engines could offer various levels of optimization. Because optimization can be resource intensive, certain of the engines could be better suited to perform a given optimization and thus, certain of the examples herein enable an engine with capacity to spare to assist an overwhelmed or close to capacity optimization engine in optimizing a query for execution.

Figure 2:
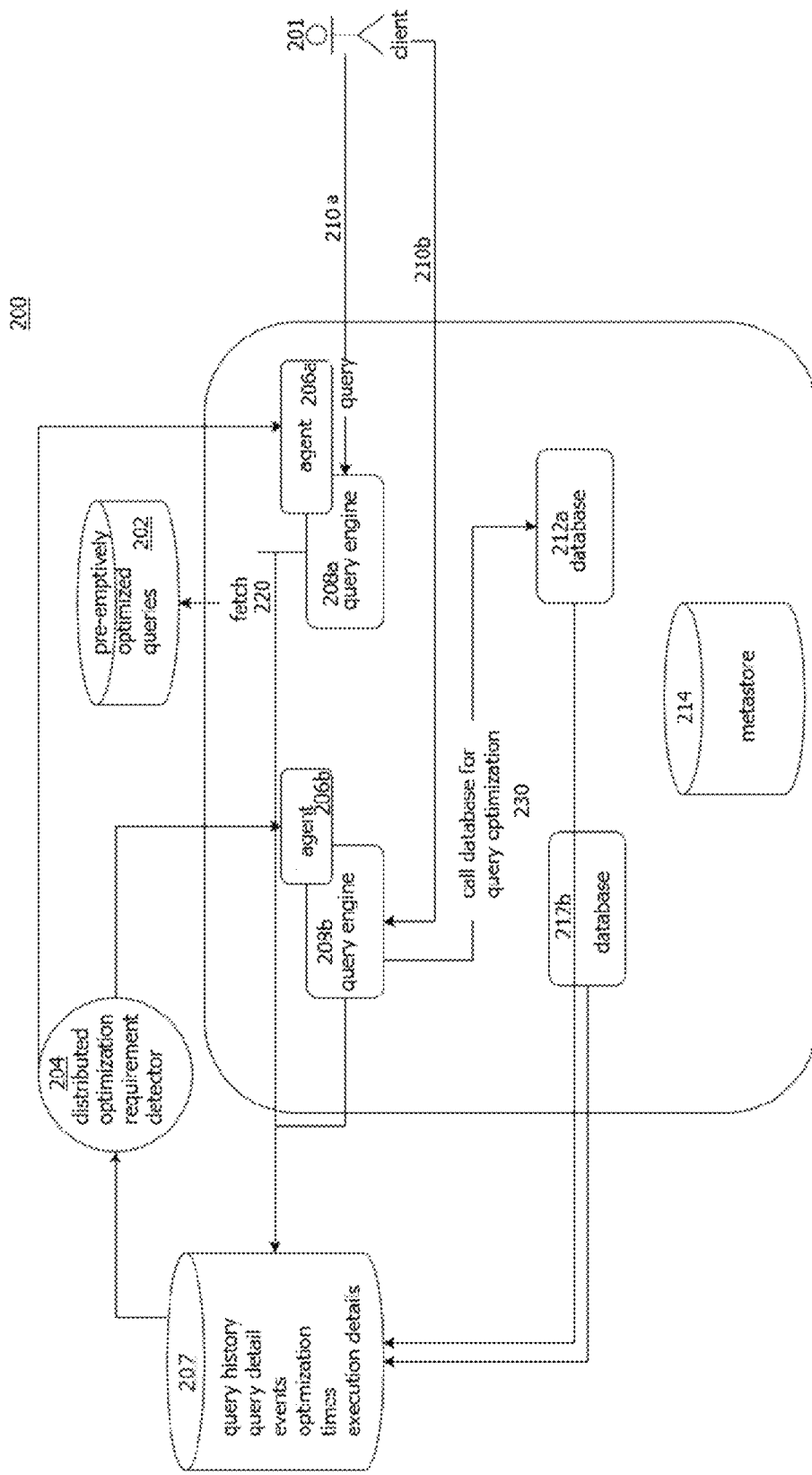
FIG. 2 is a block diagram that illustrates various aspects of a technical infrastructure and a workflow of the present disclosure.

FIG. 2 is a illustrates aspects of a technical infrastructure and a workflow 200. The technical architecture is one in which various aspects of the examples herein can be implemented. The workflow illustrates various aspects of the some of the examples herein. The technical infrastructure of FIG. 2 includes a client 201, which can be a service or application executing on one or more processors, which queries one or more resources of a multiple database environment, which can include a data lakehouse. The client 201 queries (210*a*, 210*b*) are obtained by query engines 208*a*-208*b*. In this example, the query engines 208*a*-208*b* are distributed SQL query engines that can query large data sets from different data sources, enabling enterprises to address data problems at scale. To that end, the technical architecture of FIG. 2 includes two databases 212*a*-212*b*. This number of databases is provided for illustrative purposes only. The technical environment also includes a metastore 214 which is a component that holds all of the structural information for the multiple data systems (e.g., data lakehouse), including but not limited to, the structural information for the multiple tables and partitions, including column and column type information, serializers and deserializers used to read and write data, and the related file system where the data is kept. As will be discussed in greater detail herein, to optimize a query offered by another engine 212*a*-212*b*, each engine 212*a*-212*b* accesses table metadata and statistics via a metastore 214 service within the technical environment (e.g., within the data lakehouse).

As illustrated in FIG. 2, certain of the examples herein can include program code executing on one or more processors that provides optimization as a service between optimization engines 212*a*-212*b* in a multiple engine environment (e.g., data lakehouse) and provides fallback logic. The agents 206*a*-206*b* in FIG. 2 can include the program code that provides this aspect. Program code executing in the technical environment of FIG. 2 can provide optimization as a service based on identifying commonalities between optimization engines 212*a*-212*b*, including but not limited to that the optimization engines 212*a*-212*b* are of a similar type, that the optimization engines 212*a*-212*b* access similar data sources, and/or the optimization engines 212*a*-212*b* interact with similar external entities. The pseudocode below represents how the workflow of FIG. 2 can modify an original query based on an optimization engine 212*a*-212*b* utilizing optimization as a service (e.g., agents 206*a*-206*b* executing at the optimization engines 212*a*-212*b*).

Referring to FIG. 2, when program code executing on one or more processors provides optimization as a service, the program code can modify an original query received by a client 201. The pseudocode provided below represents the service (program code) modifying the query obtained (201*a*-201*b*) by the optimization agent 206*a*-206*b* of the query engine 208*a*-208*b* and the optimization agent 206*a*-206*b* modifying the query.

opt_query=calltoOptimizer (orig_query);
if (calltoOptimizer ( ) fails) {
execute orig_query in the current engine
orig_query will continue through regular lakehouse query
    engine stages (parse, plan and execute)} else {
submit opt_query to current engine
if (current engine parsing of opt_query succeeds) {
run opt_query
} else {
submit orig_query to current engine
orig_query will continue through regular lakehouse query
    engine stages (parse, plan and execute)
}
}

The machinations of the pseudocode can be understood following various aspects of FIG. 2. When multiple (components) are provided in this description, that generally means that the progression through the technical architecture of FIG. 2 can be to one or more of the similar assets, not both the assets at the same time. As stated in the pseudocode, opt_query (the optimized version of the query) is the result when an optimizer (e.g., agent 206*a*-206*b*) is called and optimizes orig_query (the original query). In the pseudocode, program code obtains the query (210*a*-210*b*) and calls an optimizer (e.g., agent 206*a*-206*b*). If the call to the optimizer (e.g., agent 206*a*-206*b*) fails, the program code executes the original query using the query engine 208*a*-208*b*. The original query will continue through the regular lakehouse assets (e.g., database 212*a*-212*b*) and query engine 208*a*-208*b* stages (parse, plan, and execute). If the call to the optimizer (e.g., agent 206*a*-206*b*) does not fail, the program code submits the query to the current engine 208*a*-208*b* and then, if the current engine 208*a*-208*b* parsing the query succeeds, the optimized query is executed by the program code. If the optimization does not succeed, the program code can submit the original query to the current engine 208*a*-208*b* and the program code will execute the original query through the regular lakehouse query engine stages (parse, plan, and execute).

The examples herein enable an available engine within a lakehouse to optimize a query when another engine is unavailable. In existing approaches, if a targeted engine is not available, the program code executes the original query without attempting optimization with another resources. The examples herein can depart from this workflow by potentially involving additional engines in the handling of a given query such that the query can be optimized even if a default query engine is not available. In certain of the examples herein, when a query engine (e.g., 208*a*-208*b*) of the data lakehouse (as depicted as the technical architecture in FIG. 2), expose their endpoints so that the endpoints can receive a query and return an optimized query. If a given query engine does not comprise an endpoint, the program code of the lakehouse flags this engine as not qualified to take part in the intelligent optimization within lakehouse. The engines of the lakehouse can be used to supplement each other because they can each access metadata and statistics across the lakehouse assets. As illustrated in FIG. 2, metadata and statistics are available to all the query engines 208a-208b via a metastore 214 service within the lakehouse.

Figure 3:
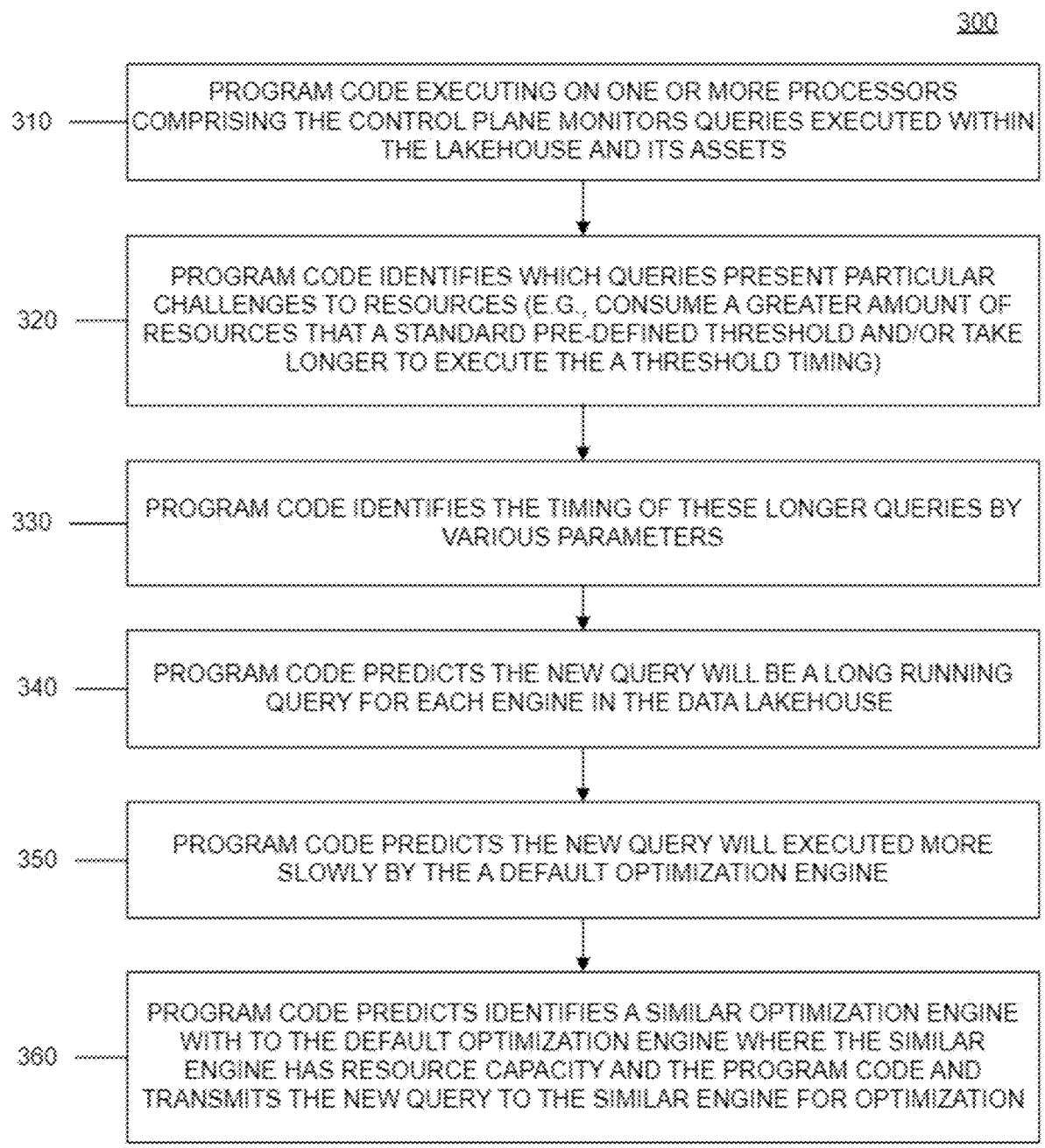
FIG. 3 illustrates various aspects of a workflow in certain of the examples in the present disclosure.
Figure 4:
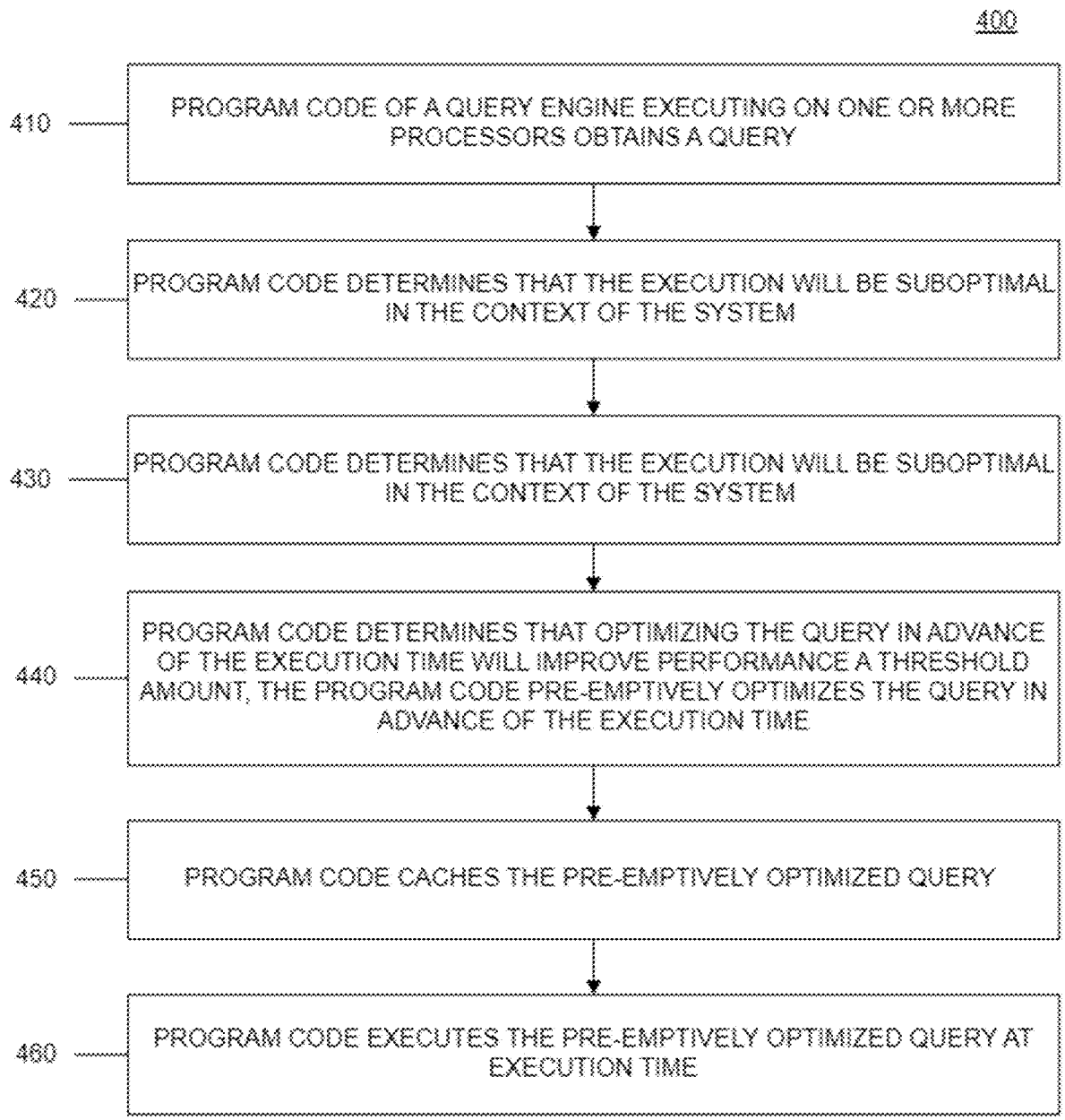
FIG. 4 illustrates various aspects of a workflow in certain of the examples in the present disclosure.
Figure 5:
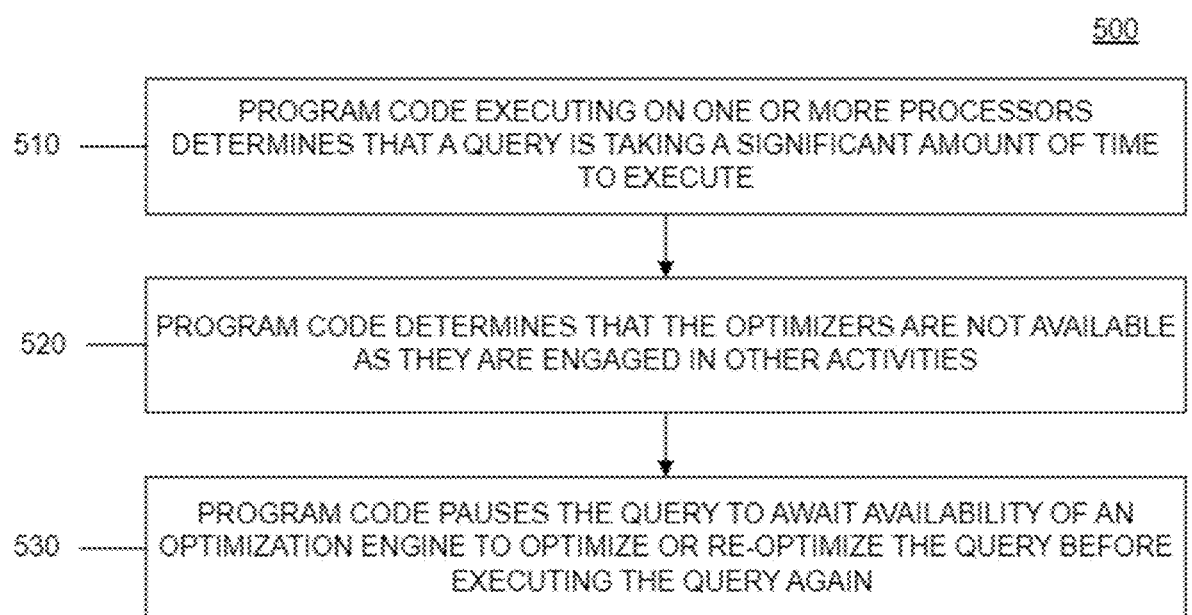
FIG. 5 illustrates various aspects of a workflow in certain of the examples in the present disclosure.

FIG. 2 adds two elements to the data lakehouse architecture that enable query optimization approaches that were unavailable in existing approaches. First, the architecture includes a query history database 207, which comprises query logs events and various stages of query execution details. All engines (e.g., query engines 208a-208b) in the data lakehouse architecture can send details to the query history database 207. Second, a distributed optimization requirement detector 204 (which can also be understood as an element of a control plane) determines if and when a query optimization (or an original query, as issues) is suboptimal. The program code of the distributed optimization requirement detector 204, although illustrated in one location in FIG. 2, can be distributed and can continuously run analyses on available data, including but not limited to, the query history database 207. The distributed optimization requirement detector 204 can analyze various dimensions, including those in the historical data, to enable various optimizations. FIGS. 3-5 are workflow that illustrate certain of these optimizations. But generally, program code of the distributed optimization requirement detector 204 enables the various optimizations. For example, if the distributed optimization requirement detector 204 determines that a query speed will be impacted by the availability or capacity of the default query engine (e.g., because similar engines have run similar queries faster), the distributed optimization requirement detector 204 can send the query to a similar type of engine to optimize the query. Second, if the distributed optimization requirement detector 204 determines that all similar engines run the query slow, the distributed optimization requirement detector 204 concludes that the plan was suboptimal for this type of engine but can transmit or recommend transmitting the query to a dissimilar engine that is available. The distributed optimization requirement detector 204 can utilize query to query and/or vectorization in changing the engine. Additionally, if a dissimilar engine optimized query is failing to a fallback mechanism, the distributed optimization requirement detector 204 can disqualify this engine for similar query optimization.

FIG. 3 is a workflow 300 that illustrates how program executing on one or more processing resources of a lakehouse (including the lakehouse of FIG. 2, can acquire a best (based on timing and resource consumption, etc.). Program code comprising a control plane tracks statistics and query events and logs. Thus, within the lakehouse architecture, the program code comprising the control plane monitors queries executed within the lakehouse and its assets (310). The program code identifies which queries present particular challenges to resources (e.g., consume a greater number of resources than a standard pre-defined threshold and/or take longer to execute a threshold timing) (320). The program code identifies the timing of these longer queries by various parameter (e.g., time of the day, day of the week manner) (330). The program code obtains a new query, based on the monitoring and identifying, the program code predicts if the new query will be a long running query for each engine in the data lakehouse (340). In some examples, the program code can utilize the data obtained via monitoring as training data in order to train a machine learning algorithm to predict when a new query will execute in a running time that exceeds a threshold running time and hence, present particular challenges to resources. Having determined that the new query (the original query) would utilize a long running time to execute, the program code can predict that a new query will executed more slowly by the a default optimization engine based on one or more or the following factors: 1) the default query engine which would optimize the new query is generally slow due to the number of activities it is performing at the time it is called to optimize and execute the new query; and/or 2) the plan the engine generates is sub-optimized (which the program code can determine based on historical data). When the program code predicts that new query will be executed more slowly by a default optimization engine (350), the program code identifies a similar engine with a lighter load than the default engine (e.g., the similar engine would be relatively free in terms of number of activities) and transmits the query to the similar (target) engine for optimization (360).

Returning the FIG. 2, to understand the workflow 300 of FIG. 3, in this context, if the program code predicts that new query will executed more slowly by the a default optimization engine 208a (350), the program code can identify a similar engine 208b with a lighter load than the default engine 208a (e.g., the similar engine would be relatively free in terms of number of activities) and transmit the query to the similar (target) engine 208b for optimization (360).

While FIG. 3 illustrates a workflow where program code identifies both a query that should be optimized and that the target engine cannot accomplish this task most efficiently, upon the client 201 issuing the query, in some examples herein, the program code can pre-emptively optimize a query. The program code optimizes a query in advance of execution based on a prediction of the program code of the data lakehouse. This workflow 400 is illustrated in FIG. 4 but is explained, for illustrative purposes only, utilizing the technical environment of FIG. 2. A client 201, issues a query (210a), which the program code obtains (410). The program code (e.g., of the query engine or the control plane) predicts the query will hit a given query engine, for example a first query engine 208a at an execution time and based on specific timing (e.g., time of the day, day of the week statistics) of the execution time (e.g., which the program code can determine based on referencing historical data in a query history database 207) the program code parses the query (420) and determines that the execution will be suboptimal in the context of the system (430).

Program code comprising a distributed optimization requirement detector 204 (which can also be understood as an element of a control plane) determines if and when a query optimization (or an original query, as issues) is suboptimal. The program code of the distributed optimization requirement detector 204, although illustrated in one location in FIG. 2, can be distributed and can continuously run analyses on available data, including but not limited to, the query history database 207, which comprises query logs events and various stages of query execution details. All engines (e.g., query engines 208a-208b) in the data lakehouse architecture can send details to the query history database 207. To determine whether a query is suboptimized, the program code of the distributed optimization requirement detector 204 can refence parameters including but not limited to, resource usages of the engine at the time of execution, overall query execution, and/or optimization time.

The program code (of the control plane) determines time to optimize the query (430). Based on determining that the time is significantly reduced through optimization or that the time utilized to optimize the query at execution time is significant (e.g., the optimization of the query in advance of the execution time will improve performance a threshold amount), the program code utilizes an engine (e.g., first query engine 208a) to pre-emptively optimize the query in advance of the execution time (440). The program code caches the pre-emptively optimized query (450) (e.g., in a memory for pre-emptively optimized queries 202). The program code executes the pre-emptively optimized query at execution time (460). In existing approaches, when a query is obtained by a query engine, the query engine parses, optimizes, plans, and executes the query. In the workflow 400 of FIG. 4, the program code of the query engine parses, parses the query, fetches pre-emptive optimization details, plans, and then executes the query.

In some examples herein, based on optimizer availability, the program code can execute a query at a time that is later than the intended execution time. FIG. 5 illustrates a workflow 500 where program code (e.g., of a control plane) can delay the execution of a query when it is lagging and re-try or schedule execution of the query at a later time based on the availability of an optimizer. As discussed earlier, an optimizer may not always be available to optimize a query and in that case, in accordance with the pseudocode, the program code may execute an original query rather than an optimized query. However, when this original query is consuming time in a manner that will adversely impact the system, the program code can delay this execution until such a as time as the query can be optimized (e.g., an optimizer is available). As illustrated in FIG. 5, program code executing on one or more processors determines that a query is taking a significant amount of time to execute (510). The query that is taking a significant amount of time can either be an original query or an optimized query, the latter being a suboptimal optimization. The threshold for identifying an original query versus an optimized query for running long can vary. For the former, it can be, for example, an hour, and for the latter, it can be, for example, ten minutes. The program code determines that the optimizers (e.g., optimization engines 208a-208b) are not available as they are engaged in other activities (520). The program code of the control plane of the data lakehouse can obtain availability data, which can include general details such as time of the day, day of the week, manner, etc. Based on the query runtime hitting a threshold, the program code can pause the query to await availability of an optimization engine to optimize or re-optimize the query before executing the query again (530). Thus, rather than an engine parse, optimize, plan, and execute, each time, in this circumstance, the program code of the engine can parse, delay the optimization, optimize when available, plan, and then, execute the query.

In some examples herein, the program code can be pre-configured to direct the timing of query optimization. For example, an administrator (e.g., client 201) can be provided with an interface to utilize to configure time limited optimization. For example, the program code could configure the system such that queries are optimized only on weekdays and not on weekends. Enabling this setting could minimize costs for queries running on non-critical schedules.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described to best explain various aspects and the practical application, and to enable others of ordinary skill in the art to understand various embodiments with various modifications as are suited to the particular use contemplated.

What is claimed is:

1. A computer-implemented method for distributing query optimization activities across a database system comprising multiple databases and multiple query optimization engines, comprising:

monitoring, by one or more processors, query execution within the database system within the multiple databases and by the multiple query optimization engines;

retaining, by the one or more processors, statistical information from the monitoring in a centralized database;

obtaining, by the one or more processors, at a query optimization engine of the database system, a new query;

predicting, by the one or more processors, based on accessing the statistical information in the centralized database, that executing the new query with the query optimization engine at a designated execution time comprises a suboptimal execution of the new query; and altering, by the one or more processors, a planned execution of the new query at the designated execution time with the query optimization engine to optimize execution of the query within the database system.

2. The computer-implemented method of claim 1, wherein altering the planned execution of the new query at the designated execution time with the query optimization engine comprises:

determining, by the one or more processors, that an existing workload of the query optimization engine will cause the suboptimal execution;

identifying, by the one or more processors, a similar optimization engine with capacity to execute the new query;

transmitting, by the one or more processors, the new query to the similar optimization engine; and executing, by the one or more processors, the new query with the similar optimization engine.

3. The computer-implemented method of claim 1, wherein altering the planned execution of the new query at the designated execution time with the query optimization engine comprises:

determining, by the one or more processors, that an existing workload of the query optimization engine will cause the suboptimal execution, wherein the determining comprises:

determining, by the one or more processors, based on the statistical information that historical queries similar to the new query executed suboptimally when executed by query optimization engines of a given types, and where the query optimization engine is of the given type;

identifying, by the one or more processors, an optimization engine of a type different than the given type, wherein the optimization engine of the type different comprises capacity and functionality to execute the new query;

transmitting, by the one or more processors, the new query to the optimization engine of the different type; and executing, by the one or more processors, the new query with the optimization engine of the different type.

4. The computer-implemented method of claim 1, wherein altering the planned execution of the new query at the designated execution time with the query optimization engine comprises:

determining, by the one or more processors, that optimizing the query in advance of the designated execution time will improve performance by an amount of time about a pre-defined threshold;

pre-emptively optimizing, by the one or more processors, with the query optimization engine, the new query in advance of the designated execution time;

caching, by the one or more processors, the new query in a memory; and executing, by the one or more processors, the new query at the designated execution time, based on obtaining the pre-emptively optimized query from the memory.

5. The computer-implemented method of claim 1, wherein altering the planned execution of the new query at the designated execution time with the query optimization engine comprises:

commencing, by the one or more processors, execution of the new query by the query optimization engine;

in advance of completing of the execution, determining, by the one or more processors, that the executing is longer than an anticipated threshold amount of time;

determining, by the one or more processors, that other query optimization engines of the multiple query optimization engines are unavailable to execute the new query; and pausing, by the one or more processors, the execution of the new query by the query optimization engine.

6. The computer-implemented method of claim 5, further comprising:

determining, by the one or more processors, that a given query optimization engine of the other query optimization engines is available to accept the new query;

transmitting, by the one or more processors, the new query to the given query optimization engine; and executing, by the one or more processors, the new query with the given optimization engine.

7. The computer-implemented method of claim 6, wherein the executing the new query with the given optimization engine comprises re-optimizing the query.

8. The computer-implemented method of claim 1, wherein the statistical information comprises query log events and details relevant to various stages of query execution.

9. The computer-implemented method of claim 1, wherein the database system comprises a data lakehouse.

10. A computer system for distributing query optimization activities across a database system comprising multiple databases and multiple query optimization engines, comprising:

a memory; and one or more processors in communication with the memory, wherein the computer system is configured to perform a method, said method comprising:

monitoring, by one or more processors, query execution within the database system within the multiple databases and by the multiple query optimization engines;

retaining, by the one or more processors, statistical information from the monitoring in a centralized database;

obtaining, by the one or more processors, at a query optimization engine of the database system, a new query;

predicting, by the one or more processors, based on accessing the statistical information in the centralized database, that executing the new query with the query optimization engine at a designated execution time comprises a suboptimal execution of the new query; and altering, by the one or more processors, a planned execution of the new query at the designated execution time with the query optimization engine to optimize execution of the query within the database system.

11. The computer system of claim 10, wherein altering the planned execution of the new query at the designated execution time with the query optimization engine comprises:

determining, by the one or more processors, that an existing workload of the query optimization engine will cause the suboptimal execution;

identifying, by the one or more processors, a similar optimization engine with capacity to execute the new query;

transmitting, by the one or more processors, the new query to the similar optimization engine; and executing, by the one or more processors, the new query with the similar optimization engine.

12. The computer system of claim 10, wherein altering the planned execution of the new query at the designated execution time with the query optimization engine comprises:

determining, by the one or more processors, that an existing workload of the query optimization engine will cause the suboptimal execution, wherein the determining comprises:

determining, by the one or more processors, based on the statistical information that historical queries similar to the new query executed suboptimally when executed by query optimization engines of a given types, and where the query optimization engine is of the given type;

identifying, by the one or more processors, an optimization engine of a type different than the given type, wherein the optimization engine of the type different comprises capacity and functionality to execute the new query;

transmitting, by the one or more processors, the new query to the optimization engine of the different type; and executing, by the one or more processors, the new query with the optimization engine of the different type.

13. The computer system of claim 10, wherein altering the planned execution of the new query at the designated execution time with the query optimization engine comprises:

determining, by the one or more processors, that optimizing the query in advance of the designated execution time will improve performance by an amount of time about a pre-defined threshold;

pre-emptively optimizing, by the one or more processors, with the query optimization engine, the new query in advance of the designated execution time;

caching, by the one or more processors, the new query in a memory; and executing, by the one or more processors, the new query at the designated execution time, based on obtaining the pre-emptively optimized query from the memory.

14. The computer system of claim 10, wherein altering the planned execution of the new query at the designated execution time with the query optimization engine comprises:

commencing, by the one or more processors, execution of the new query by the query optimization engine;

in advance of completing of the execution, determining, by the one or more processors, that the executing is longer than an anticipated threshold amount of time;

determining, by the one or more processors, that other query optimization engines of the multiple query optimization engines are unavailable to execute the new query; and pausing, by the one or more processors, the execution of the new query by the query optimization engine.

15. The computer system of claim 14, further comprising:

determining, by the one or more processors, that a given query optimization engine of the other query optimization engines is available to accept the new query;

transmitting, by the one or more processors, the new query to the given query optimization engine; and executing, by the one or more processors, the new query with the given optimization engine.

16. The computer system of claim 15, wherein the executing the new query with the given optimization engine comprises re-optimizing the query.

17. The computer system of claim 10, wherein the statistical information comprises query log events and details relevant to various stages of query execution.

18. A computer program product for distributing query optimization activities across a database system comprising multiple databases and multiple query optimization engines, the computer program product comprising:

one or more computer readable storage media and program instructions collectively stored on the one or more computer readable storage media readable by at least one processing circuit to:

monitor query execution within the database system within the multiple databases and by the multiple query optimization engines;

retain statistical information from the monitoring in a centralized database;

obtain, at a query optimization engine of the database system, a new query;

predict, based on accessing the statistical information in the centralized database, that executing the new query with the query optimization engine at a designated execution time comprises a suboptimal execution of the new query; and alter a planned execution of the new query at the designated execution time with the query optimization engine to optimize execution of the query within the database system.

19. The computer program product of claim 18, wherein altering the planned execution of the new query at the designated execution time with the query optimization engine comprises:

determining, by the one or more processors, that an existing workload of the query optimization engine will cause the suboptimal execution;

identifying, by the one or more processors, a similar optimization engine with capacity to execute the new query;

transmitting, by the one or more processors, the new query to the similar optimization engine; and executing, by the one or more processors, the new query with the similar optimization engine.

20. The computer program product of claim 18, wherein altering the planned execution of the new query at the designated execution time with the query optimization engine comprises:

determining, by the one or more processors, that an existing workload of the query optimization engine will cause the suboptimal execution, wherein the determining comprises:

determining, by the one or more processors, based on the statistical information that historical queries similar to the new query executed suboptimally when executed by query optimization engines of a given types, and where the query optimization engine is of the given type;

identifying, by the one or more processors, an optimization engine of a type different than the given type, wherein the optimization engine of the type different comprises capacity and functionality to execute the new query;

transmitting, by the one or more processors, the new query to the optimization engine of the different type; and executing, by the one or more processors, the new query with the optimization engine of the different type.

* * * * *